(12) United States Patent  (10) Patent No.: US 8,113,124 B2
Smock et al.  (45) Date of Patent: Feb. 14, 2012

(54) AUTO LAUNDRY CONVEYOR DOLLY

(76) Inventors: Daniel D. Smock, Sycamore, PA (US);
Jeffrey A. Sizer, Morgantown, WV (US)

( * ) Notice: Subject to any disclaimer, the term of this patent is extended or adjusted under 35 U.S.C. 154(b) by 249 days.

(21) Appl. No.: 12/580,743

(22) Filed: Oct. 16, 2009

(65) Prior Publication Data

US 2011/0088585 A1   Apr. 21, 2011

(51) Int. Cl.
*B65G 25/00* (2006.01)
(52) U.S. Cl. .............. 104/172.3; 198/717; 104/162
(58) Field of Classification Search .............. 104/162, 104/165, 172.1, 172.3, 172.2; 198/717, 725, 198/728, 732
See application file for complete search history.

(56) References Cited

U.S. PATENT DOCUMENTS 4,864,936 A * 9/1989 Rietsch, Jr. .............. 104/172.1
6,647,894 B1 * 11/2003 Simoes ...................... 104/172.1
7,243,605 B1   7/2007 Belanger et al.
2008/0229965 A1 * 9/2008 Balash ........................ 104/162

* cited by examiner

*Primary Examiner* — S. Joseph Morano
*Assistant Examiner* — Zachary Kuhfuss
(74) *Attorney, Agent, or Firm* — Spilman Thomas & Battle, PLLC

(57) ABSTRACT

A car wash dolly that uses a single shaft having two camshaft lobes and a series of snap ring grooves. The bolt-less design of the dolly includes a stronger camshaft and minimized component count. The center link and wheels may be mounted directly on the shaft to produce a sturdy design for the dolly. Grooves and snap rings are provided to "lock" wheels in their place on the shaft and to keep wheels physically close to one another to prevent dirt or other debris from getting between the wheels. Optional thrust washers also may be provided between plastic wheels and snap rings to reduce friction between the wheels during operation of the dolly in a car wash facility. The dolly according to the present disclosure is intended to roll, via a conveyor chain, on a slotted track of an auto-laundry system. Because of rules governing Abstracts, this Abstract should not be used to construe the claims in this patent application.

21 Claims, 6 Drawing Sheets

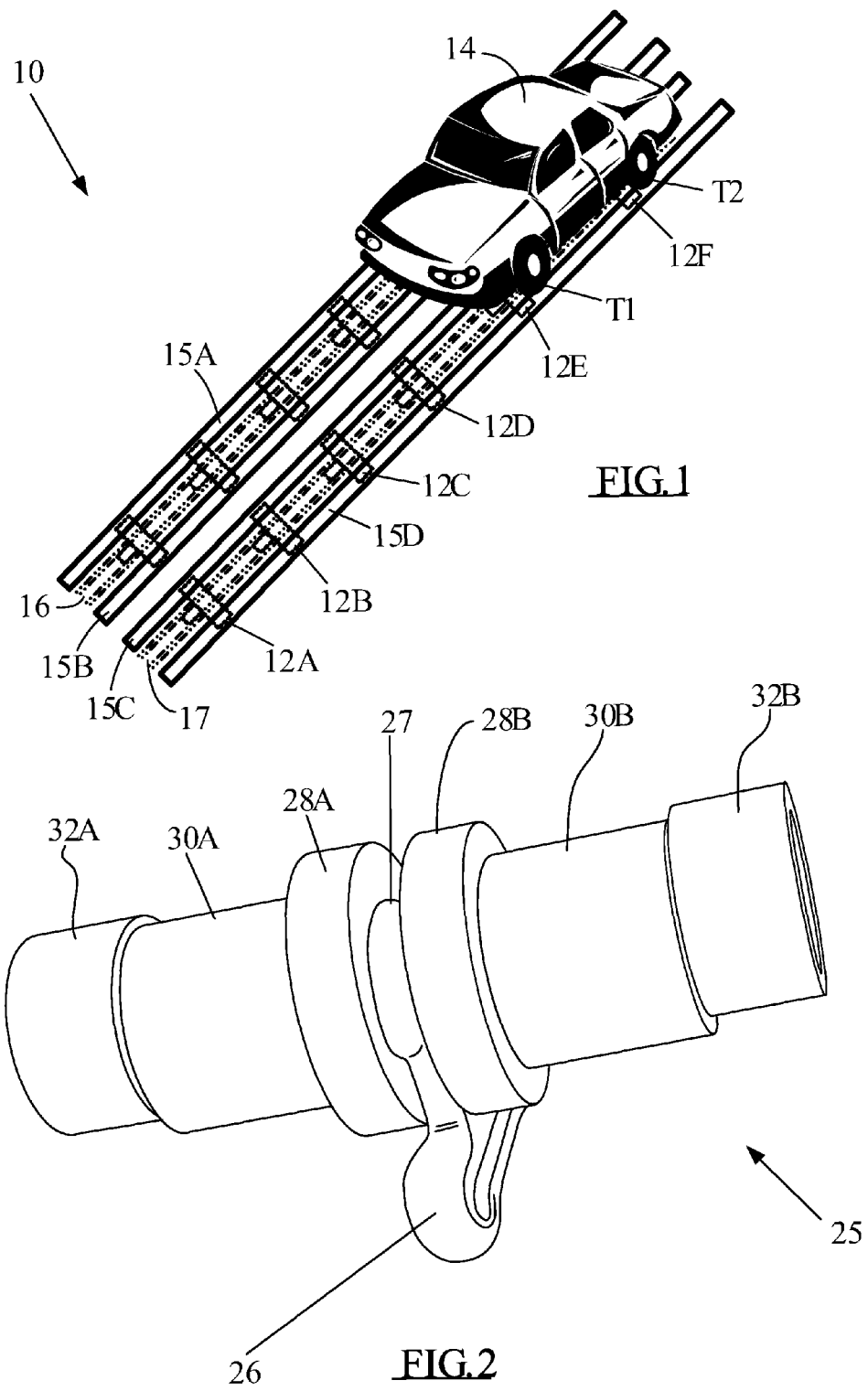

AUTO LAUNDRY CONVEYOR DOLLY

BACKGROUND

1. Field of the Disclosure

The present disclosure generally relates to the field of auto-laundry systems of the type employing an endless loop chain conveyor linking a plurality of car-pusher dollies that roll along slotted tracks, and, more particularly, to a car wash dolly design that uses a single, solid shaft with two camshaft lobes and a series of snap ring grooves.

2. Brief Description of Related Art

Certain auto-laundry systems, otherwise popularly known as "car washes," use endless chain conveyors of the type having "dollies" linked into the continuous-loop chain of a conveyor at regular intervals. These dollies are used to push vehicles along a track by engaging the tread surface of the tires of the vehicle. The dollies, in turn, are connected into the continuous loop chain by means of a center link.

The track structure which is used in combination with the chain and the dollies typically comprises three separate tracks mounted in parallel and at different levels. The top track accommodates the tire of the vehicle being washed and also provides the travel path for dollies which are selected at any given time to push the vehicle along the track. An intermediate level track provides the forward track for unselected dollies to continue to move on, and the bottom level track provides a return path for the dollies. A selector is used to transfer dollies from the intermediate to the top level tracks when a vehicle is present to be conveyed.

The U.S. Pat. No. 7,243,605 to Belanger et al. describes a car wash dolly design that utilizes a steel axle member in the form of a steel bolt having a threaded end which receives a nut. A center link is mounted on the axle member and three different pairs of wheels are mounted on the axle member on opposite sides of the center link. Bearings are provided between all of the wheels for independent rotation of the wheels.

A dolly employing such a bolt-based design includes many lose parts that are "assembled" via the bolt which holds bushing tubes for each wheel, wheels, and the center link in place to produce the final structure. In other words, a single, thin bolt is forced to carry many components and hold them in place while bearing the weight of a vehicle. This arrangement frequently leads to bending of the bolt during operation, thereby necessitating removal and replacement of the damaged dollies. Furthermore, the bolt and nut engagement may become lose under certain operational conditions. Hence, the bolt-based dolly design may be commercially undesirable because it leads to a reduced lifespan of the dolly, resulting in expensive repairs/replacements.

SUMMARY

In one embodiment, the present disclosure relates to a car wash dolly having a stronger camshaft with bolt-less design and minimized component count. The center link and wheels may be mounted directly on the shaft to produce a sturdy design for the dolly. Grooves and snap rings are provided to keep wheels close to one another to prevent dirt or other debris from getting between the wheels. The dolly is intended to roll, via a conveyor chain, on a slotted track of a car wash system.

In an embodiment, an auto-laundry conveyor dolly of the type intended to roll on a slotted track is provided. The dolly includes a shaft and a center link having a chain attachment portion for attachment to a chain of the auto-laundry conveyor and a circular portion that encircles the shaft, the circular portion being attached to the shaft by a pin passing through the circular portion of the center link and into the shaft.

In an embodiment, an auto-laundry conveyor dolly of the type intended to roll on a slotted track is provided that includes a metal shaft with a plurality of grooves formed in the metal shaft. One or more wheels are furthermore mounted on the shaft between pairs of physically-adjacent grooves. A snap ring may furthermore be inserted into each groove to retain the wheels in their places.

In a further embodiment, the present disclosure relates to a shaft for an auto-laundry conveyor dolly. The shaft comprises a cylindrical metal tube that includes a cylindrical central portion, a pair of central grooves, a pair of cylindrical side portions, a pair of side grooves, a pair of cylindrical side lobes, and a pair of end grooves. The cylindrical central portion is configured to receive a pair of inner wheels and a center link. The pair of cylindrical side portions is formed on opposite sides of the central portion by forming or cutting a pair of central grooves into the metal tube at corresponding ends of the central portion, wherein both of the side portions and the central portion are coaxial and of substantially the same external diameter, and wherein each side portion is configured to receive a corresponding one of a pair of intermediate wheels. The pair of side grooves is cut into the metal tube at opposite outer ends of the pair of side portions and is coaxial with the pair of side portions. A pair of cylindrical side lobes is formed on both ends of the metal tube at opposite outer sides of the pair of side grooves, wherein each side lobe in the pair of side lobes is linked to a respective side portion in the pair of side portions via a corresponding side groove from the pair of side grooves and is configured to receive a corresponding one of a pair of outer wheels, and wherein centers of the pair of side lobes are axially offset from the centers of the pair of side portions and the central portion. The pair of end grooves is cut into the metal tube at opposite outer ends of the pair of side lobes and being coaxial with the pair of side lobes.

In another embodiment, the present disclosure relates to an auto-laundry conveyor dolly of the type intended to roll on a slotted track. The dolly comprises a shaft made of a cylindrical metal tube that includes: (i) a cylindrical central portion, (ii) a pair of cylindrical side portions on opposite sides of the central portion, wherein the pair of side portions is formed by forming or cutting a pair of central grooves into the metal tube at corresponding ends of the central portion, and wherein both of the side portions and the central portion are coaxial and substantially of the same external diameter, (iii) a pair of side grooves cut into the metal tube at opposite outer ends of the pair of side portions and being coaxial with the pair of side portions, (iv) a pair of cylindrical side lobes formed on both ends of the metal tube by forming the metal tube at opposite outer sides of the pair of side grooves, wherein each side lobe in the pair of side lobes is linked to a respective side portion in the pair of side portions via a corresponding side groove from the pair of side grooves, and wherein centers of the pair of side lobes are axially offset from the centers of the pair of side portions and the central portion, and (v) a pair of end grooves cut into the metal tube at opposite outer ends of the pair of side lobes and being coaxial with the pair of side lobes. The dolly further comprises: a center link attached to the central portion for connecting the dolly into a conveyor chain of the slotted track; a pair of inner wheels mounted on the central portion on opposite sides of the center link and sandwiched between the pair of central grooves; a first pair of open-ended snap rings non-movably inserted into the pair of central grooves; a second pair of open-ended snap rings non-movably inserted into the pair of side grooves; a pair of intermediate wheels mounted on the pair of side portions between the first pair of snap rings and the second pair of snap rings, wherein the intermediate wheels are coaxial with and substantially of the same internal diameter as the inner wheels; a third pair of open-ended snap rings non-movably inserted into the pair of end grooves; and a pair of outer wheels mounted on the pair of side lobes between the second pair of snap rings and the third pair of snap rings, wherein the outer wheels being axially offset from and of a smaller internal diameter than the intermediate wheels.

In a still further embodiment, the present disclosure relates to an auto-laundry dolly connected to a conveyor chain of a slotted track of an auto-laundry facility. In addition to the components discussed above in the preceding paragraph, the dolly may further comprise a cross-sectionally substantially circular pin hole drilled into the middle of a surface of the central portion, wherein the top surface is longitudinally substantially aligned with respective top surfaces of the pair of side lobes and the pair of side portions. The center link attached to the central portion may comprise a link hole of substantially the same diameter as the pin hole. The dolly may further comprise a cylindrical pin inserted through the link hole and the pin hole to thereby non-movably attach the center link to the central portion for connecting the dolly into the conveyor chain of the slotted track. A first pair of thrust washers may be mounted on the central portion on opposite sides of the center link between the inner wheels and the center link, and a second pair of thrust washers may be mounted on the pair of side portions between the first pair of snap rings and sides of the intermediate wheels adjacent to the first pair of snap rings.

Accordingly, the present invention provides solutions to the shortcomings of prior auto-laundry dollies and components of auto-laundry dollies, methods of using auto-laundry dollies and components of auto-laundry dollies, and systems using auto-laundry dollies and components of auto-laundry dollies. Those of ordinary skill in the construction and operation of auto-laundries will readily appreciate that those details described above and other details, features, and advantages of the present invention will become further apparent in the following detailed description of the preferred embodiments of the invention.

BRIEF DESCRIPTION OF THE DRAWINGS

For the present disclosure to be easily understood and readily practiced, the present disclosure will now be described for purposes of illustration and not limitation, in connection with the following figures, wherein:

FIG. 1 illustrates a partial, simplified view of an exemplary auto-laundry or car wash system employing dollies according to one embodiment of the present disclosure;

FIG. 2 shows a fully-assembled view of an exemplary dolly according to one embodiment of the present disclosure;

DETAILED DESCRIPTION

Figure 3:
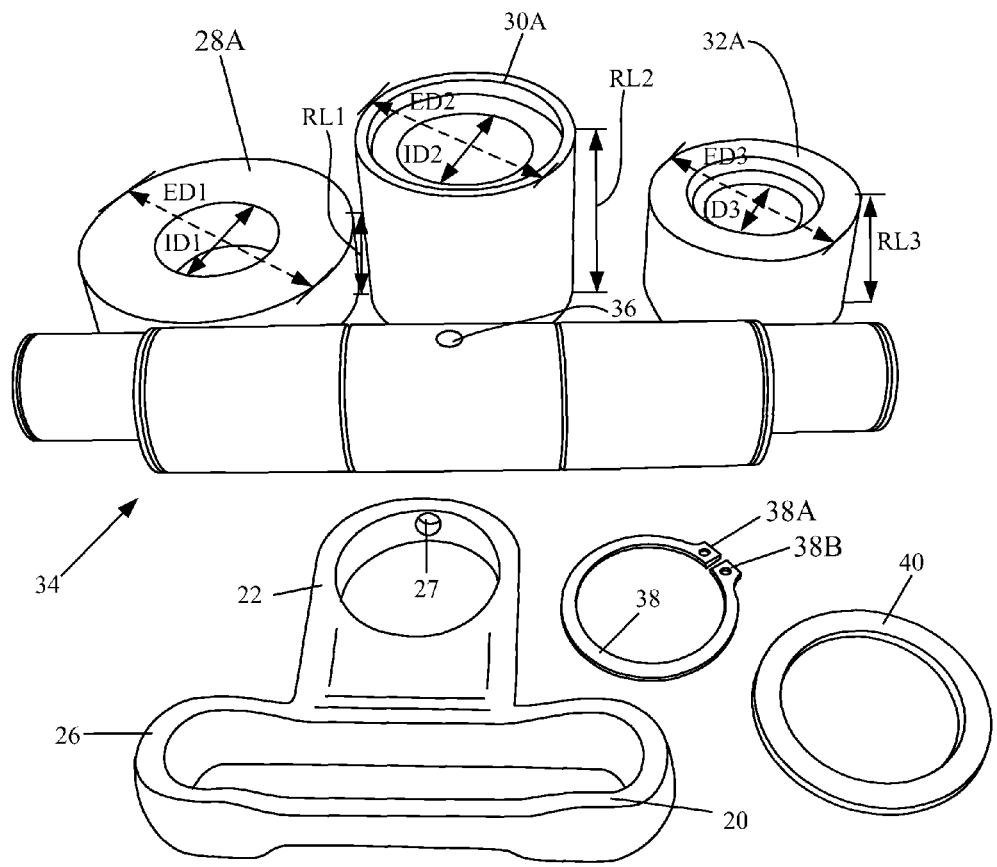
FIG. 3 depicts an exemplary set of components that may be used to assemble the dolly depicted in FIG. 2 according to one embodiment of the present disclosure.

The accompanying figures and the description that follows set forth the present disclosure in embodiments of the present disclosure. However, it is contemplated that persons generally familiar with mechanical designs, and more particularly with designs of car wash dollies, will be able to apply the teachings of the present disclosure in other contexts by modification of certain details. Accordingly, the figures and description are not to be taken as restrictive of the scope of the present disclosure, but are to be understood as broad and general teachings. In the discussion herein, when any numerical value is referenced, such value should be understood to be the most practically-feasible design approximation taking into account variances that may be introduced by such mechanical operations as machining, tooling, drilling, etc.

It is observed at the outset that the directional terms such as "top," "bottom," "right," "left," "horizontal," "vertical," "upper," "lower," etc., and derivatives thereof are used hereinbelow for illustrative purpose only to facilitate description and understanding of relative positions of various mechanical components or parts constituting the car wash dolly according to the teachings of the present disclosure. Hence, such terms and derivatives thereof shall relate to the present disclosure as it is oriented in the drawing figures provided herein.

It is further observed here that the mechanical structures, components, assemblies, or engineering drawings thereof illustrated in various figures in the instant application are not drawn to scale, but are rather illustrated for the convenience of understanding various design aspects of a car wash dolly according to the teachings of the present disclosure.

Any reference in the specification to "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment. References to "or" are furthermore intended as inclusive so "or" may indicate one or another of the ored terms or more than one ored term.

FIG. 1 illustrates a partial, simplified view of an exemplary auto-laundry or car wash system 10 employing dollies 12A through 12F according to one embodiment of the present disclosure. A car 14 is shown to have entered the car wash system 10 with its tires placed on tracks 15A through 15D. Although not clearly visible in FIG. 1, it is noted here that in the slotted-track car wash system 10, each tire of the car 14 spans two adjacent tracks. Thus, for example, the tires T1 and T2 will typically remain placed on the tracks 15C and 15D during the auto laundry operation. Two, track-specific conveyor chains 16, 17 are also shown in FIG. 1. As is known in the art, each of these conveyor chains 16, 17 operates in an endless loop pulling the dollies 12A-12F along the track. The conveyor chains 16, 17 may run under the gap or "slot" between adjacent tracks. The conveyor chains 16, 17 along with the dollies that are selected to engage with car tires—e.g., the dollies 12E and 12F in FIG. 1—push the tires (and, hence, the car) along the tracks during the car wash operation. The unselected dollies (e.g., the dollies 12A-12D in FIG. 1) will continue to move on along corresponding tracks via respective conveyor chains as is known in the art.

It is noted here that the simplified depiction of the dollies 12A-12F in FIG. 1 is for illustrative purpose only. The actual shape and constructional details of these dollies 12A-12F are illustrated more accurately and described in further detail below with reference to discussion of dolly 25 in FIGS. 2 through 12. It is further noted here that the constructional details of tracks 15A-15D (e.g., track slots, track rails, cross beams, support assemblies, etc.) and conveyor chains 16-17 are not shown in FIG. 1 for ease of illustration, because of their lack of relevance to the present discussion, and because of the availability of many known configurations for these elements of a car wash system. In an operational car wash system, the dollies according to the present disclosure may be used in conjunction with various presently-available slotted track and conveyor designs, which can be selected as desired.

FIG. 2 shows a fully-assembled view of an exemplary dolly 25 according to one embodiment of the present disclosure. In one embodiment, each of the dollies 12A-12F in the car wash system of FIG. 1 may be identical to the dolly 25 in FIG. 2. In the dolly 25 shown in FIG. 2, a center link 26 is attached to a central portion of a shaft 34 (not visible in FIG. 2, but shown, e.g., in FIGS. 3, 4, 8, and 12). A link hole 27 (discussed later below) is visible in the center link 26 is visible in FIG. 2. The dolly 25 includes a first substantially identical pair of inner wheels 28A-28B, a second substantially identical pair of intermediate wheels 30A-30B, and a third substantially identical pair of outer wheels 32A-32B mounted on opposite sides of the center link 26 in corresponding pairs as shown in FIG. 2. As is known in the art, the inner wheels 28A-28B may primarily be disposed in a slot (such as slot 16 and 17 illustrated in FIG. 1) centered between opposite longitudinally extending track rails (such as tracks 15A-15D illustrated in FIG. 1) and may remain in rolling contact with a car's tires (not shown) when a car is situated thereon. The intermediate wheels 30A-30B are arranged axially with the inner wheels 28A-28B and are generally in rolling contact with the tracks (such as tracks 15A-15D illustrated in FIG. 1) so as to permit the dolly 25 to roll along the tracks. The outer wheels 32A-32B are arranged in an axially offset manner to ride along the lower track, such as the bottom side of tracks 15C and 15D, when the dolly 25 is not engaged with a vehicle and moving along the lower track. The outer wheels 32A-32B may ride along a wear strip (not shown) when the associated dolly 25 is operating on the upper track 15C, 15D or may be idle when the dolly 25 is operating on the upper track 15C, 15D and no wear strip is present. In various embodiments, each type of wheel—an inner wheel, an intermediate wheel, or an outer wheel—may have various dimensions.

FIG. 3 depicts an exemplary set of components that may be used to assemble the dolly 25 illustrated in FIG. 2 according to one embodiment of the present disclosure. For simplicity of illustration, only one wheel 28A, 30A, and 32A from the corresponding pair of wheels is shown in FIG. 3. Although not visible in FIG. 2, it is seen from FIG. 3 that the dolly 25 may comprise of a cylindrical shaft 34 designed to receive various other components of the dolly 25. The shaft 34 may function as a "foundation" upon which other components of the dolly 25 may be mounted. The other such components include the three pairs of wheels—the inner wheels 28A-28B, the intermediate wheels 30A-30B, and the outer wheels 32A-32B, the center link 26 with the link hole 27 (discussed later hereinbelow) drilled therein to align with a pin hole 36 drilled on the top of the central portion of the shaft 34, a metallic pin (not shown in FIG. 3, but illustrated as pin 60 in FIGS. 9-10) inserted through holes 27 and 36 to hold the dolly 25 in the desired clocked position for use in the conveyor, and three pairs of open-ended snap rings (one such snap ring 38 with two ends 38A and 38B is shown in FIG. 3 and discussed in more detail later with reference to FIG. 11) that are inserted into and retained within corresponding grooves (not identified in FIG. 3, but discussed later with reference to FIG. 4) to maintain the wheels (e.g., wheels 28A, 30A, etc.) in their given shaft locations during operation of the dolly 25. The grooves and snap rings maintain the wheels in close proximity to one another to minimize accumulation of dirt or other debris between the wheels. In one embodiment, the dolly 25 may also optionally include at least two pairs of thrust washers or "spacers" (one such washer 40 is shown in FIG. 3 and discussed in more detail later hereinbelow) between adjacent pairs of wheels to reduce friction between the wheels. In one embodiment, one pair of washers 40 may be placed on each side of the center link 26 and thus be positioned between the center link 26 and the pair of inner wheels 28A-28B. A second pair of washers 40 may be placed between the inner wheels 28A-28B and their adjacent intermediate wheels 30A-30B as shown in the exemplary partial illustration in FIG. 11. A third pair of washers 40 may be placed between the intermediate wheels 30A-30B and the outer wheels 32A-32B.

In the embodiment of FIG. 3, the internal diameter ID1 of an inner wheel (e.g., the wheel 28A) may be substantially the same as the internal diameter ID2 of an intermediate wheel (e.g., the wheel 30A). On the other hand, the internal diameter ID3 of an outer wheel (e.g., the wheel 32A) may be smaller than the internal diameter ID1 of an intermediate wheel or the diameter ID2 of an inner wheel. On the other hand, in one embodiment, the external diameter ED1 of an inner wheel (e.g., the wheel 30A) may be larger than the external diameter ED2 of an intermediate wheel (e.g., the wheel 30A) or the external diameter ED3 of an outer wheel (e.g., the wheel 32A). In one embodiment, the external diameter ED2 of an intermediate wheel is larger than the external diameter ED3 of an outer wheel. As illustrated in the embodiment of FIGS. 2-3, each intermediate wheel may be length-wise longer than either an inner wheel or an outer wheel, whereas an outer wheel may be length-wise longer than an inner wheel. The "lengths" of individual wheels are indicated by references "RL1," "RL2," and "RL3" in FIG. 3. As mentioned before, in one embodiment, each of the wheels 28A-28B, 30A-30B, and 32A-32B may be made of plastic sufficiently hardened to withstand the wear and tear inherent in a car wash operation.

Figure 4:
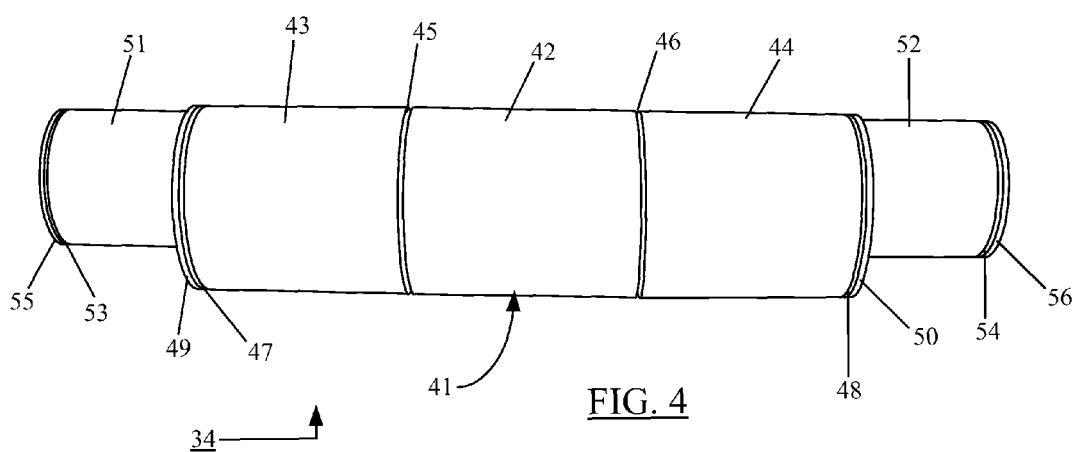
FIG. 4 shows exemplary structural details of the shaft illustrated in FIG. 3.

FIG. 4 shows exemplary structural details of the shaft 34 illustrated in FIG. 3. As shown in FIG. 3, the dolly 25 may include a single, one piece shaft 34 that may be formed from one piece of metal or multiple pieces of metal welded or otherwise formed into such a single piece. From FIG. 4, it is seen that the shaft 34 may be made in the form of a single, hollow, cylindrical tube 41. The tube 41 may furthermore be formed of metal, such as steel in a form that is resistant to corrosive surroundings, such as those that typically exist in an auto-laundry. The tube 41 may include a cylindrical central portion 42 that may receive the pair of inner wheels 28A-28B and the center link 26 (for example, using a pin inserted through the pin hole 36, which is not clearly visible in the view of FIG. 4). The tube 41 may further include a pair of cylindrical side portions 43, 44 on opposite sides of the central portion 42. The side portions 43, 44 may be formed by cutting a pair of central grooves 45, 46 into the metal tube 41 at corresponding ends of the central portion 42. It is seen from FIG. 4 that the side portions 43-44 and the central portion 42 may be coaxial and of substantially the same external diameter. Each side portion 43, 44 may receive a corresponding intermediate wheel 30A, 30B as illustrated in the assembled view of the dolly 25 in FIG. 2. Side grooves 47, 48 may be cut into the metal tube 41 at opposite outer ends of the corresponding side portions 43, 44 as illustrated in FIG. 4. Each side groove 47, 48 may be coaxial with its adjacent side portion 43, 44 (and, hence, also may be coaxial with the central portion 42). The cutting of side grooves 47, 48 may result in the formation of side groove boundaries 49, 50. As shown in the embodiment of FIG. 4, the shaft 34 also includes a pair of cylindrical side lobes 51, 52 that are formed on both ends of the tube 41. The cylindrical side lobes 51, 52 may be formed by machining the tube 41 at opposite outer sides of the pair of side grooves 47, 48 (i.e., beyond the side groove boundaries 49, 50), casting the tube 41 with the side lobes 51, 52, attaching the side lobes 51, 52 to the tube 41 by, for example, welding, or otherwise forming the side lobes 51, 52 on the tube 41, as desired. Each side lobe 51, 52 may receive a corresponding outer wheel 32A, 32B as shown in FIG. 2.

In the embodiment illustrated in FIG. 4, the shaft 34 is made of metal and may be made of 1045 heat-treated and chromed (HTC) steel. The shaft 34 includes a plurality of grooves 45, 46, 47, 48, 53, 54 formed into the metal shaft 34. The wheels 28A, 28B, 30A, 30B, 32A, 32B are mounted on the shaft 34 between pairs of physically-adjacent grooves 45, 46, 47, 48, 53, 54. Snap rings 38 are placed in the grooves 45, 46, 47, 48, 53, 54 to retain the wheels 28A, 28B, 30A, 30B, 32A, 32B in their desired positions on the shaft 34.

Some or all of the wheels 28A, 28B, 30A, 30B, 32A, 32B may have indentations on one or both sides to accommodate snap rings 38 and thrust washers 40 where desired and maintain the wheels 28A, 28B, 30A, 30B, 32A, 32B in close proximity. Maintaining the wheels 28A, 28B, 30A, 30B, 32A, 32B in close proximity has various benefits including minimizing collection of dirt between the wheels 28A, 28B, 30A, 30B, 32A, 32B. Thus, the wheels 28A, 28B, 30A, 30B, 32A, 32B are formed with a hole through the center of the wheel 28A, 28B, 30A, 30B, 32A, 32B defining an inner diameter of each wheel 28A, 28B, 30A, 30B, 32A, 32B. The wheels 28A, 28B, 30A, 30B, 32A, 32B also have an outer surface defining an outer diameter of each wheel 28A, 28B, 30A, 30B, 32A, 32B, and the wheels 28A, 28B, 30A, 30B, 32A, 32B have a first side and a second side. Where a side indentation is desired on one or more of the wheels 28A, 28B, 30A, 30B, 32A, 32B the indentation may be formed on one or both sides of the wheel 28A, 28B, 30A, 30B, 32A, 32B extending from the hole toward the outer surface, but not extending as far as the outer surface, as is shown on wheels 30A and 32A in FIG. 3.

In the embodiment illustrated in FIG. 3, the center link 26 includes a chain attachment portion 20 for attaching the dolly 25 to a conveyor chain and a circular portion 22 for encircling the shaft 34. In an embodiment, the circular portion 22 is attached to the shaft 34 by a pin 60 (shown in FIGS. 9-10) passing through the link hole 27 drilled or otherwise formed in the circular portion 22 of the center link 26 and into the pin hole 36 formed by drilling or otherwise in the shaft 34. Once the center link 26 is attached to the shaft 34, the first inner wheel 28A is placed on one side of the center link 26 and the second inner wheel 28B is placed on the opposite side of the center link 26. A thrust washer 40 may be placed between each of the inner wheels 28A, 28B and the center link 26. An additional thrust washer 40 may then be placed on the outside of each of the inner wheels 28A, 28B and a snap ring 38 may be placed in shaft grooves 45 and 46 to hold the inner wheels 28A, 28B in place. A thrust washer 40 may then be placed around the shaft 34 and against the outer side of the snap rings 38 placed in shaft grooves 45 and 46 and intermediate wheels 34A, 34B are placed on opposite ends of the shaft 34 and moved against the snap rings 38 or thrust washers 40 where they are used. A thrust washer 40 may next be placed on the outside of each of the intermediate wheels 30A, 30B and a snap ring 38 may be placed in shaft grooves 47 and 48 to hold the intermediate wheels 30A, 30B in place. A thrust washer 40 may be placed around the lobes 51 and 52 of the shaft 34 if desired and the first outer wheel 32A may be placed on the first lobe 51 and the second outer wheel 32B may be placed on the second lobe 52. Where desired, a thrust washer 40 may be placed against the outer sides of the outer wheels 32A, 32B and a snap ring 38 is inserted into shaft groove 53 to hold the first outer wheel 32A in place and another snap ring 38 is inserted into shaft groove 54 to hold the second outer wheel 32B in place.

It is observed here that although the side portions 43, 44 and the central portion 42 are coaxial, the centers of the side lobes 51, 52 may be axially offset from the centers of the side portions 43, 44 and the central portion 42. This axially offset formation of side lobes 51, 52 allows the outer wheels 32A, 32B to ride along the bottom of the track 15C, 15D when not engaged with a vehicle and to ride above and out of contact with the car wash tracks during operation of the dolly 25 in engaged operation with a vehicle. Referring again to FIG. 4, it is seen that a pair of end grooves 53, 54 also may be cut into the tube 41 at opposite outer ends of the pair of side lobes 51, 52. Each end groove 53, 54 may be coaxial with its corresponding side lobe 51, 52 as illustrated in FIG. 4. It is noted here that the cutting or forming of the end grooves 53, 54 may result in the formation of end groove boundaries 55, 56. The dimensions of various portions formed on the tube 41 are discussed hereinbelow with reference to FIGS. 6 and 7.

It is noted here that FIG. 4 shows an exemplary placement of the grooves 45-48 and 53-54. For example, in different embodiments, the grooves 45-48 may be placed at different locations along the shaft 34, thereby changing the lengths of the central portion 42, the side portions 43-44, and the side lobes 51-52 from those shown in FIGS. 4 and 6B. For example, in one embodiment, the size of the wheels 28A-B, 30A-B, and 32A-B to be fitted onto the dolly 25 may dictate the length of the shaft 34 as well as the placement of the grooves on the shaft 34. The width and depths of the grooves in other embodiments may be different as well from those shown in FIG. 6A. Such design flexibility is contemplated as part of the construction of the dolly 25 according to the teachings of the present disclosure.

In one embodiment, the tube 41 (and, hence the shaft 34) is made of 1045 heat treated and chromed (HTC) steel. As is known, the heat treatment hardens the steel, thereby allowing the dolly 25 to withstand the operational conditions existing in a typical car wash facility. It is seen here that the dolly 25 does not use an assembly of metal parts, but rather uses one shaft 34 that has two lobes 51, 52 formed thereon, one lobe 51, 52 being formed on each end of the shaft 34.

Figure 5:
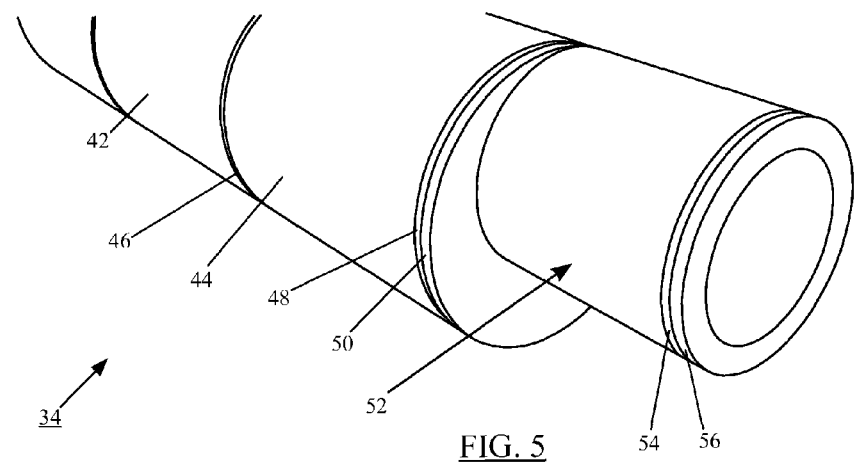
FIG. 5 illustrates a close-up view of a portion of the shaft illustrated in FIG. 4.

FIG. 5 illustrates a close-up view of a portion of the camshaft 34 illustrated in FIG. 4. In FIG. 5, shaft elements on the right side of the central portion 42 are shown in more detail to more clearly illustrate various groove formations and shaft geometry. Typically, similar shaft elements would be symmetrically present on the left side of the central portion 42 as well as the right side illustrated in FIG. 5 (as can be seen from FIGS. 2 and 4). In FIG. 5, the cylindrical side portion 44 and the cylindrical side lobe 52 are shown in a close-up view, thereby more clearly identifying the side groove 48, the side groove boundary 50, the end groove 54, and the end groove boundary 56.

Figure 6A:
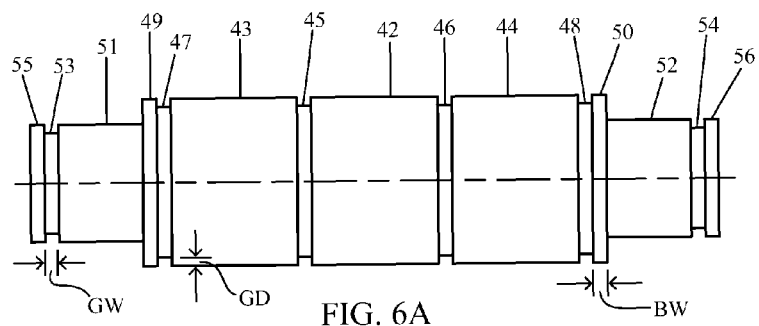
FIGS. 6A through 6C depict different projection views and dimensional details of the camshaft shown in FIG. 4.
Figure 6B:
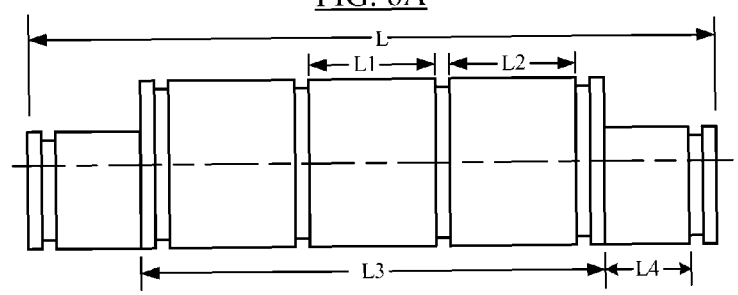
Figure 6C:
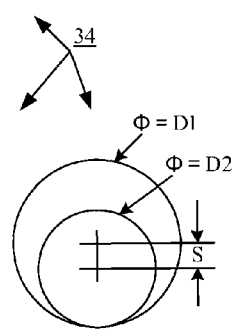

FIGS. 6A through 6C depict a top view, a side view, and an end view, respectively and dimensional details of the shaft 34 shown in FIG. 4. As noted before, the diagrams in FIGS. 6A-6C (and those in FIGS. 7A-7B) are not drawn to scale, but are merely to facilitate better understanding of the structural details of the shaft 34. FIG. 6A shows the top view of the shaft 34 with side lobes 51, 52 at the bottom (instead of at the top as in FIG. 4). FIG. 6A identifies all shaft 34 portions, grooves, and groove boundaries in correspondence with the three-dimensional view of the shaft 34 in FIG. 4 and, hence, additional details of these structural parts of the shaft 34 are not repeated herein for the sake of brevity. In one embodiment, each of the six grooves—45, 46, 47, 48, 53, and 54—is of identical width, which is indicated by reference letters "GW" in FIG. 6A. Similarly, in one embodiment, each of these six grooves is of identical depth (indicated by reference letters "GD" in FIG. 6A) from the corresponding outer surface. In another embodiment, each of the four groove boundaries—49, 50, 55, and 56—is of the same width, which is indicated by the reference letters "BW" in FIG. 6A. In one embodiment, GW is approximately 0.072 inch, GD is approximately 0.062 inch, and BW is approximately 0.063 inch. Hence, it is observed from FIG. 6A that the shaft 34 as illustrated in FIGS. 6A-6C may be a substantially symmetrical structure with similar parts having substantially similar dimensions.

FIG. 6B provides a side view of the shaft 34 with the side lobes 51, 52 at the bottom. It is noted here that the reference numerals in FIG. 6A are not repeated in FIG. 6B to maintain clarity in the drawings and to avoid clutter. FIG. 6B identifies axial lengths of various portions of the shaft 34 according to one embodiment of the present disclosure. The length of the entire tube 41 (and, hence, the length of the entire shaft 34) is indicated by reference letter "L," the length of the central portion 42 is indicated by reference indicator "L1," the length of each side portion 43, 44 is indicated by reference indicator "L2," the length of the shaft excluding the side lobe portions is indicated by reference indicator "L3," and the length of each side lobe 51, 52 is indicated by reference indicator "L4." In one embodiment, L is approximately 10.76 inches, L1 is approximately 2.56 inches, L2 is approximately 2.35 inches, L3 is approximately 7.67 inches, and L4 is approximately 1.41 inches.

FIG. 6C shows an end view for the corresponding side view illustrated in FIG. 6B. The axially offset orientation of the side lobes 51, 52 is clearly evident from the spacing or offset "S" between the centers of the two circles: (i) a first circle representing as "D1" the external diameter of the shaft portion that includes the central portion 42 and two side portions 43, 44 (but excludes the side lobes 51, 52), and (ii) a second circle representing as "D2" the external diameter of each side lobe 51, 52. In one embodiment, D1 is approximately 1.875 inches, D2 is approximately 1.375 inches, and S is approximately 0.25 inch.

Figure 7A:
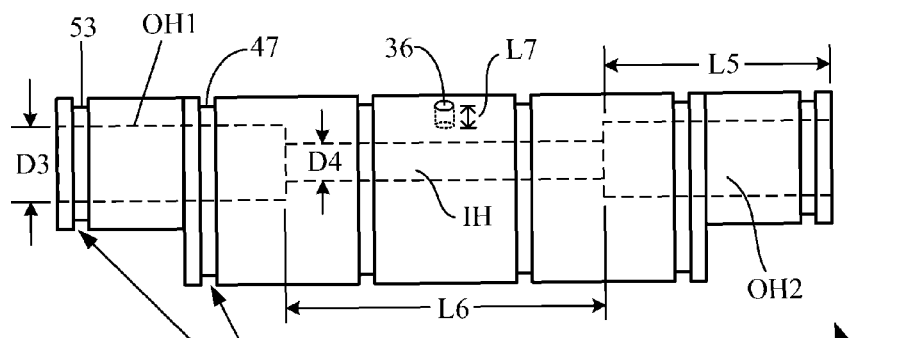
FIGS. 7A and 7B show additional dimensional details of the shaft depicted in FIG. 4.
Figure 7B:
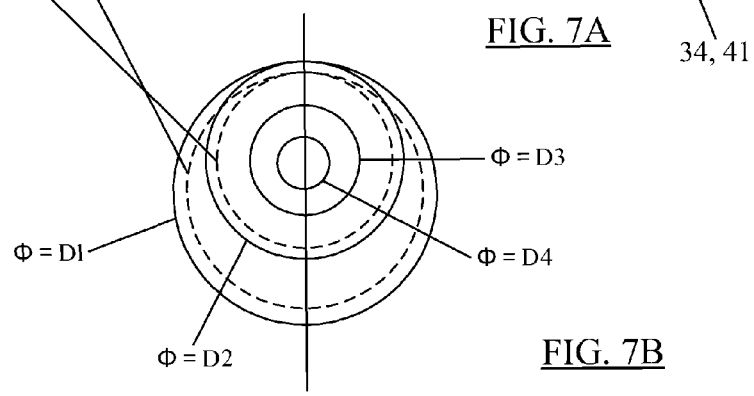

FIGS. 7A and 7B show additional dimensional details of the camshaft 34 illustrated in FIG. 4. As mentioned earlier, in one embodiment, the tube 41 is a hollow, cylindrical tube. In that regard, FIGS. 7A and 7B illustrate the dimensions of various holes formed into the tube 41. A pair of large "outer" holes (OH1,OH2), each having a diameter of "D3," may be formed, for example by drilling a predetermined distance "L5" (from each end of the tube 41) into the tube 41 from both outer ends of the tube 41 as shown in FIG. 7A. In one embodiment, D3 is approximately 1 inch, and L5 is approximately 4 inches. These outer holes (OH1, OH2) may function as lightning holes to remove some of the mass from the shaft 34, thereby reducing the weight of the shaft 34 without negatively impacting its strength under operational conditions. It is seen from FIG. 7A that the diameter "D3" of each outer hole OH1, OH2 may be considered as defining the "internal" diameter of its corresponding side lobe 51 or 52.

In one embodiment, an "inner" hole (IH) having a diameter "D4" (which may be smaller than the diameter "D3" of each outer hole OH1, OH2) and having a length "L6" also may be drilled into the tube 41 between the pair of outer holes. The inner hole (IH) may remain coaxial with its adjacent outer holes (OH1, OH2) as shown in FIG. 7A. However, in an alternative embodiment, different relative placement of the inner and outer holes also may be contemplated. Furthermore, the outer holes (OH1, OH2) may not be axially symmetrical (coaxial) with the side lobes 51, 52 in another embodiment. In the embodiment of FIG. 7A, D4 is approximately 0.5 inch and L6 is approximately 2.76 inches. In one implementation, the inner hole (IH) may be initially drilled through the entire steel tube 41 after heat treating the tube 41. The chrome plating of the shaft 34 may be then performed. Subsequently, additional metal may be drilled out of the tube 41 to form the outer holes OH1, OH2.

In the front view of FIG. 7A, the cross-sectionally substantially circular pin hole 36 is also shown for clearer illustration of constructional details of the shaft 34. In one embodiment, the pin hole 36 may be cylindrical in shape with a diameter of approximately 3/8 inch, and a length "L7" of approximately 3/8 inch to accommodate the pin 60 (illustrated in FIGS. 9-10). As noted before, the pin hole 36 may be drilled into the tube 41 to allow attachment of the center link 26 to the shaft 34 during assembly of the dolly 25. Additional assembly details for the dolly 25 are provided below with reference to discussion of FIGS. 8-12.

In the side view of FIG. 7B (which corresponds to the front view depicted in FIG. 7A), the circles illustrated in FIG. 6C are shown along with (i) a circle representing the inner hole (IH) with diameter "D4," (ii) a circle representing the outer holes (OH1, OH2) with diameter "D3," and (iii) dotted circles representing the larger and smaller grooves (e.g., the larger side groove 47 and the smaller end groove 53) cut into the tube 41. The side view of FIG. 7B thus illustrates the axially-offset, hollow, cylindrical geometry of the shaft 34 in more detail. Although not visible in the side view of FIG. 7B, it is observed that the pin hole 36 may be located at a ½ inch clocked position from the top of the shaft 34 as measured from the central axis passing through all the circles in FIG. 7B.

Figure 8:
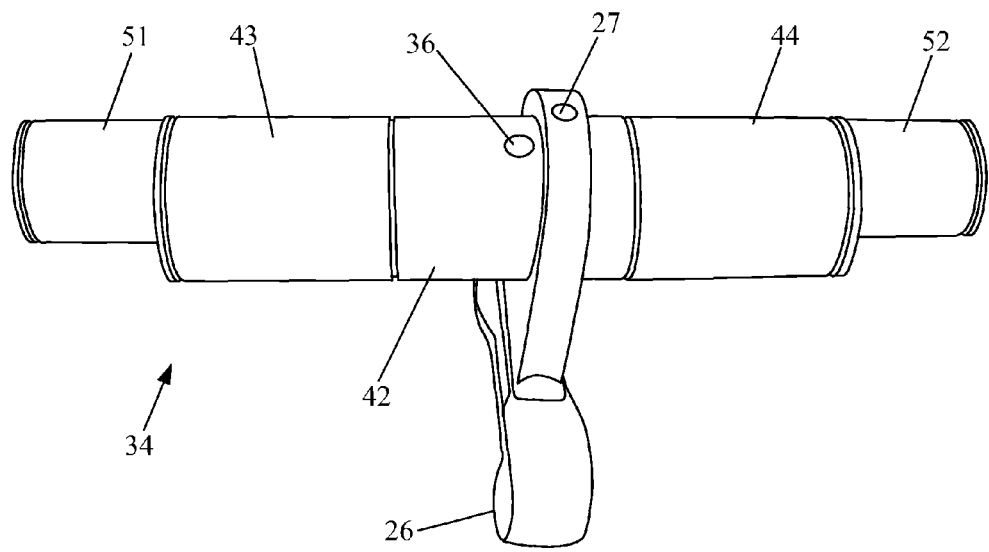
FIG. 8 illustrates how the holes on the shaft and the center link may be aligned to attach the center link to the shaft.

FIG. 8 illustrates how the holes of the shaft 34 and the center link 26 may be aligned to attach the center link 26 to the shaft 34. As shown in FIG. 8, a substantially circular pin hole 36 may be drilled into the middle of the central portion 42 of the tube 41. The top surface in which the pin hole 36 is drilled may be that surface which is longitudinally substantially aligned with the respective top surfaces of the side portions 43, 44 and the side lobes 51, 52. Alternately, as illustrated in FIGS. 3 and 8, the pin hole 36 may be drilled or otherwise formed a distance from the top surface of the central portion 42 of the tube 41. The positional alignment may allow for proper operational orientation of the center link 26 upon its attachment to the shaft 34. The link hole 27 may be drilled into a circular portion of the center link 26 that fits over the center portion 42 of the tube 41. The center link 26 may thus be fitted over the shaft 34 such that the link hole 27 is aligned with the pin hole 36 and the center link 26 may be attached to the shaft 34 in a proper orientation by inserting a pin 60 (illustrated in FIGS. 9-10) through the top of the link hole 27 into the shaft 34 via the pin hole 36. That pin 60 may also be metal and may be welded or otherwise secured in place in through the link hole 27 and pin hole 36. In one embodiment, the link hole 27 is of substantially the same diameter as the pin hole 36 such that the pin 60 fully or nearly fully fills both the link hole 27 and the pin hole 36.

In an embodiment, the cylindrical central portion 42 has a longitudinal portion L (shown on FIG. 6B), a diameter, and first and second ends. A first cylindrical lobe 51, having a diameter smaller than the cylindrical central portion 42 diameter, extends from the first end of the cylindrical central portion 42 such that an outer surface of the first cylindrical lobe 51 is flush with an outer surface of the cylindrical central portion 42 and none of the surfaces of the first cylindrical lobe 51 extend beyond the surfaces of the cylindrical central portion 42. Similarly, a second cylindrical lobe 52 having a diameter smaller than the cylindrical central portion 42 diameter and extends from the second end of the cylindrical central portion 42 such that an outer surface of the second cylindrical lobe 52 is flush with the outer surface of the cylindrical central portion 42 that is flush with the outer surface of the first cylindrical lobe 51 and none of the surfaces of the second cylindrical lobe 52 extend beyond the surfaces of the cylindrical central portion 42. A pin hole 36 is formed in the cylindrical central portion 42 substantially centered along the longitudinal portion L (shown on FIG. 6B) of the cylindrical central portion 42 and at least one-quarter of one inch from the surface of the central cylinder that is flush with the first and second cylindrical lobes 51, 52. In embodiments, the pin hole 36 is clocked one-quarter to three-quarters of an inch from the flush surface. The center link 26 furthermore includes a link hole 27 and the pin 60 is disposed through the link hole 27 and into the pin hole 36.

Figure 9:
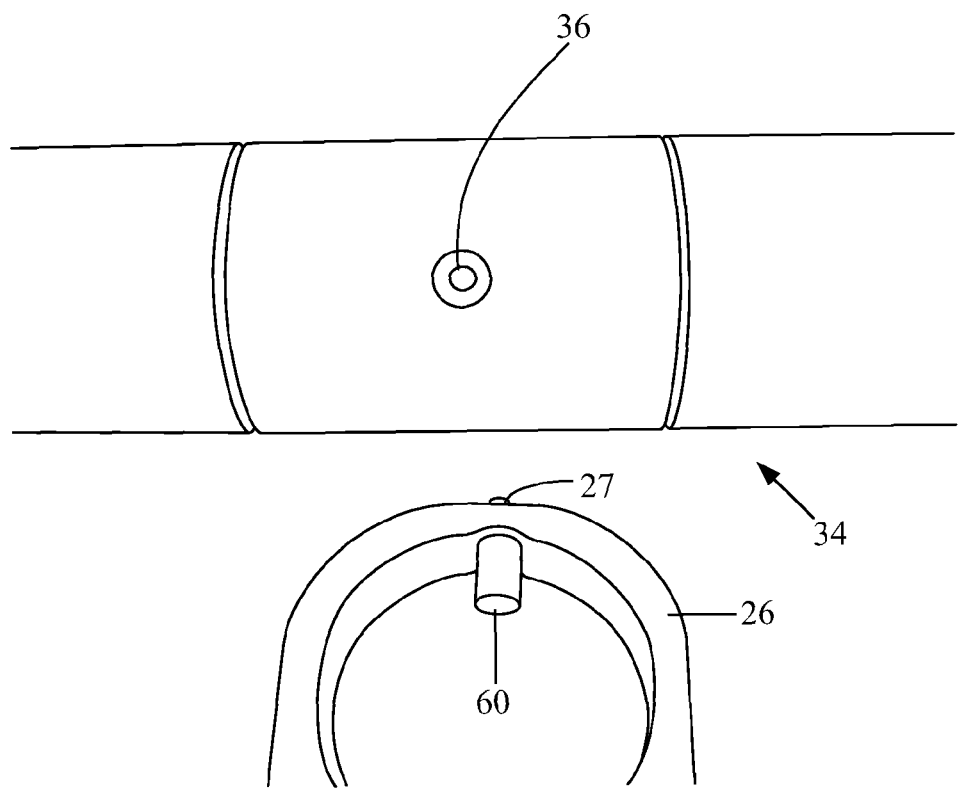
FIGS. 9 and 10 provide close-up views of the pin that attaches the center link to the shaft during assembly of the car wash dolly illustrated in FIG. 2.
Figure 10:
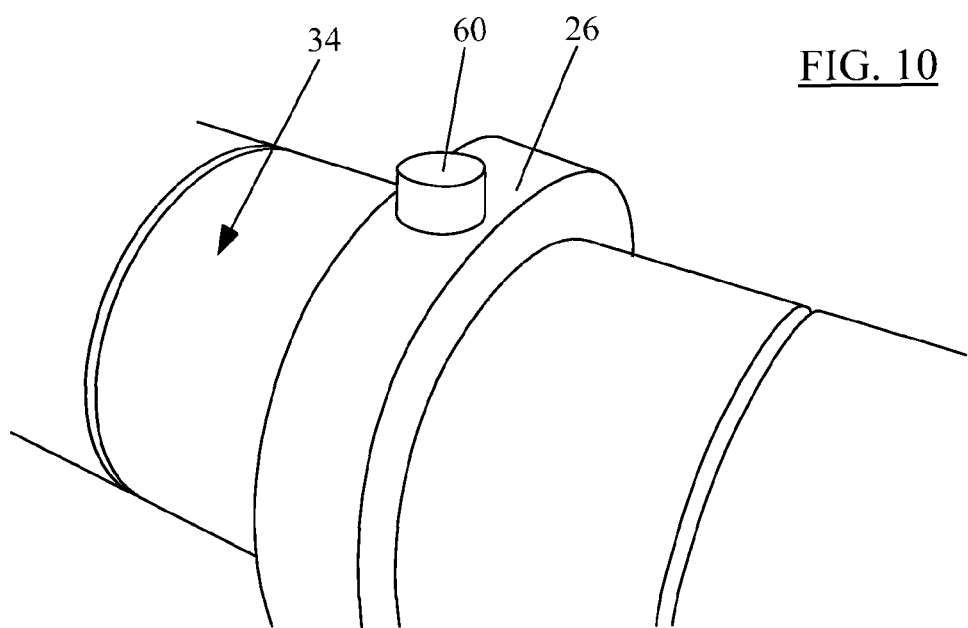

FIGS. 9 and 10 provide close-up views of the pin 60 that attaches the center link 26 to the shaft 34 during assembly of the car wash dolly 25 in FIG. 2. As shown in FIG. 9, in one embodiment, the pin 60 is also made of steel and is in a cylindrical shape. Upon alignment of the pin hole 36 and the link hole 27, the center link 26 may be pinned, via pin 60, into a clocked position on the shaft 34 so as to hold the entire dolly 25 assembly in the desired clocked position for use on the auto-laundry conveyor. Upon attachment of the center link 26 to the shaft 34 via the pin 60 (as shown in the close-up view of FIG. 10), a correct clocked position can be obtained for the shaft 34 of the dolly 25 so as to align the dolly 25 with a tire resting between two dollies 25 on an auto-laundry conveyor. The pin 60 may thus lock the shaft 34 to the center link 26 to maintain proper orientation of the shaft 34 during operation of the dolly 25.

In one embodiment, after complete insertion of the pin 60 through the pin hole 36 into the link hole 26 of the shaft 34, the pin 60 is welded to the center link 26 so as to further strengthen the attachment of the center link 26 with the shaft 34. In one embodiment, the pin 60 is approximately ⅜ inch in diameter to closely matched to the diameters of the pin hole 36 and the link hole 27, thereby allowing a snug fit between the center link 26 and the shaft 34 for the life of the dolly 25. In one embodiment, the pin 60 may be approximately 5/16 inches in length.

Figure 11:
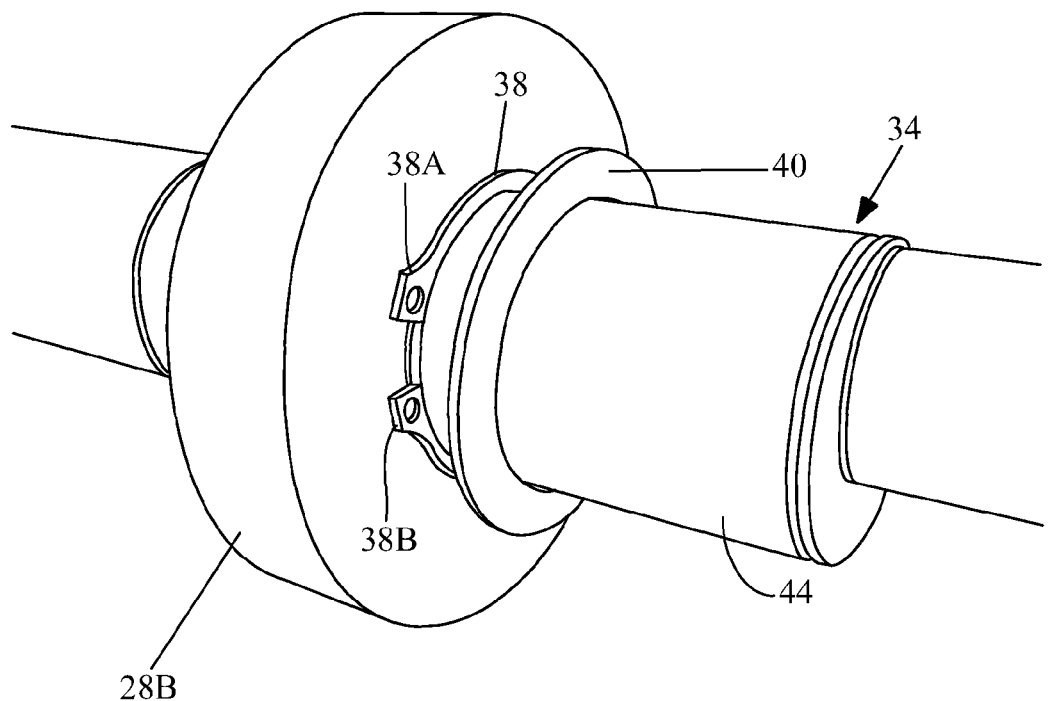
FIG. 11 shows a partial assembly view depicting placement of a snap ring and a thrust washer adjacent to a tire engaging wheel on the shaft of the car wash dolly according to one embodiment of the present disclosure.
Figure 12:
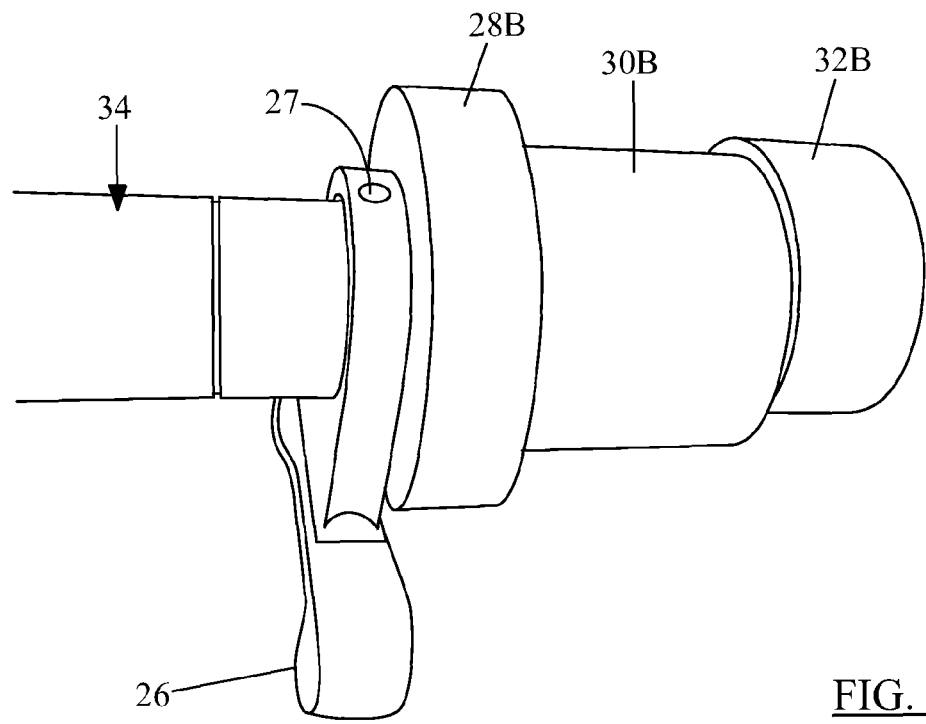
FIG. 12 illustrates a partially-assembled view of the dolly illustrated in FIG. 2.

FIG. 11 shows a partial assembly view depicting placement of a snap ring 38 and a thrust washer 40 adjacent to an inner wheel (e.g., the wheel 28B) on the shaft 34 of the car wash dolly 25 according to one embodiment of the present disclosure. The snap ring 38 and washer 40 are also shown in FIG. 3. As is seen from FIG. 11, in one embodiment, the snap ring 38 may be "open-ended" in the sense that its two ends 38A, 38B do not connect. This may allow for easy "snapping" of the ring 38 into its corresponding groove (here, the groove 46 shown in FIGS. 4-5). The snap ring 38 is thus inserted into its corresponding groove after the inner wheel 28B is mounted on the shaft 34. The thrust washer 40 may be optionally inserted after the snap ring 38, but prior to mounting the intermediate wheel (here, the wheel 30B as shown in FIG. 12) on the shaft 34. Thus, the washer 40 may remain inserted between the ring 38 and the intermediate wheel 30B (not shown in FIG. 11, but shown in FIG. 12), thereby reducing friction between the wheels 28A and 30B during operation of the dolly 25. Furthermore, as mentioned before, the grooves and snap rings may "lock" the wheels in their respective places on the shaft 34 and keep different wheels physically close to one another (while minimizing friction between such closely-spaced adjacent wheels) to minimize or prevent dirt or other debris from lodging between the wheels Although only one snap ring 38 is shown in FIG. 11 for ease of illustration, it is evident that a total of six snap rings—one in each of the six grooves 45, 46, 47, 48, 53, and 54—may be employed in one embodiment of the present disclosure. The snap rings for the grooves 45-48 may be substantially identical to the snap ring 38 shown in FIG. 11. However, because of the smaller diameter of the end grooves 53, 54, the snap rings (not shown) for those grooves may be smaller in size than the snap rings 38 for other grooves on the shaft 34. Like the shaft 34, all of these snap rings also may be made of steel or other suitable hard material to withstand the rigorous operational conditions typically present in an auto-laundry.

The thrust washer 40 may be made of steel and annular in structure, with its internal diameter substantially similar to the diameter of the corresponding side portion (here, the side portion 44 in FIG. 11) so as to allow a reasonably snug fit of the washer 40 on the shaft 34 while still allowing the washer 40 to remain rotationally movable around the shaft 34. A similar second washer (not shown) also may be mounted between the wheels 28A and 30A in a similar manner (i.e., after inserting a snap ring after the wheel 28A in the groove 45, but before mounting the wheel 30A on the side portion 43). Although not shown in FIG. 11, in one embodiment, a second pair of thrust washers—each similar to the thrust washer 40—also may be inserted on opposite sides of the center link 26 between the center link 26 and adjacent inner wheels 28A, 28B. This second pair of thrust washers may be mounted on the shaft 34 after the center link 26 is placed on the shaft 34, but prior to mounting the wheels 28A, 28B on the shaft 34. In one embodiment, the thrust washers in this second pair may be welded to the center link 26 to prevent their rotational movement during operation of the dolly 25, but still providing an additional friction-reducing surface between the outer sides of the center link 26 and corresponding adjacent sides of the inner wheels 28A, 28B.

In one embodiment, no washer may be needed after the snap rings (such as snap ring 38A) are placed in grooves 47, 48 because the outer surfaces of corresponding groove boundaries 49, 50 may themselves function as friction-reducing "spacers" between the pairs of adjacent intermediate and outer wheels—i.e., the wheel pairs 30A-32A and 30B-32B. Similarly, no washer may be needed at the end of the shaft 34 as well—i.e., after the snap rings (not shown) in grooves 53 and 54.

FIG. 12 illustrates a more-detailed partially-assembled view of the dolly 25 in FIG. 2. In FIG. 12, the center link 26 is shown mounted on the shaft 34 along with one set of wheels—i.e., the wheels 28B, 30B, and 32B—mounted on the shaft 34 on the right side of the center link 24 in the manner discussed above with reference to FIG. 11. Various snap rings and thrust washers are not visible in the assembled view of FIG. 12. The other set of wheels—i.e., the wheels 28A, 30A, and 32B—also may be mounted on the left side of the center link 26 in a similar fashion to fully assemble the dolly 25 as shown in FIG. 2.

The foregoing describes design of a car wash dolly that uses a single, solid shaft with two camshaft lobes and a series of snap ring grooves. The bolt-less design of the dolly includes a stronger camshaft and minimized component count than prior dollies. The center link and wheels may be mounted directly on the shaft to produce a sturdy design for the dolly. Grooves and snap rings are provided to "lock" wheels in their place on the shaft and to keep wheels physically close to one another to minimize the entry of dirt or other debris between the wheels. Optional thrust washers also may be provided between plastic wheels and snap rings to reduce friction between the wheels during operation of the dolly in a car wash facility. As mentioned earlier, the dolly according to the present disclosure is intended to roll, via a conveyor chain, on a slotted track of a car wash system. It is noted here that although the shaft, snap rings, and thrust washers of the dolly are discussed to have been made of steel, other load-bearing materials (e.g., carbon fiber, different alloys of metals, etc.) also may be used instead of steel for one or more of such components as per relevant design considerations in alternative embodiments. Similarly, wheels made of materials other than plastic may be employed in the dolly to carry out desired functionality during a car wash operation. Furthermore, as mentioned before, various dimensional details provided hereinabove are exemplary in nature, and can be modified as needed without departing from the scope of the teachings in the present disclosure. Also, although the discussion hereinbefore focuses on a car wash facility, the dolly design principles discussed herein may be used to design similar dollies for use in laundry facilities for other types of vehicles or for other purposes.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A shaft for an auto-laundry conveyor dolly, the shaft comprising:
    a cylindrical tube that includes:
    a cylindrical central portion configured to receive a pair of inner wheels and a center link;
    a pair of cylindrical side portions formed one on each of opposite sides of said central portion, said pair of side portions separated from said cylindrical center portion by a pair of central grooves, said side portions being coaxial with said cylindrical central portion and of substantially the same external diameter as the cylindrical central portion, and said pair of side portions each being configured to receive an intermediate wheel, said pair of side portions further including outer ends opposite the central portion, each of said outer ends having a side groove; and
    a pair of cylindrical side lobes formed one on each end of said cylindrical tube, each side lobe in said pair of side lobes having an end and configured to receive a corresponding one of a pair of outer wheels, said pair of side lobes being axially offset from the pair of side portions and the central portion.

2. The shaft of claim 1, further comprising a cross-sectionally substantially circular pin hole formed in said central portion.

3. The shaft of claim 2, wherein said pin hole is configured to receive a pin inserted through said center link so as to connect said center link to said central portion.

4. The shaft of claim 1, wherein the side lobes have an external diameter that is smaller than the external diameter of said side portions.

5. The shaft of claim 1, further comprising a top surface of said central portion longitudinally substantially aligned with top surfaces of said side portions and longitudinally substantially aligned with top surfaces of said pair of side lobes.

6. The shaft of claim 1, wherein said cylindrical tube further includes:
    a pair of outer holes formed a predetermined distance into said cylindrical tube from the ends of said pair of side lobes.

7. The shaft of claim 6, wherein said cylindrical tube further includes
    an inner hole formed in said cylindrical tube between said pair of outer holes and coaxial therewith, the diameter of said inner hole being smaller than the diameter of said pair of outer holes.

8. The shaft of claim 1, wherein said cylindrical tube is made of 1045 heat treated and chromed (HTC) steel.

9. An auto-laundry conveyor dolly of the type intended to roll on a slotted track, said dolly comprising:
    a shaft;
    a center link having a chain attachment portion for attachment to a chain of the auto-laundry conveyor and a circular portion that encircles the shaft, the circular portion being attached to the shaft by a pin passing through the circular portion of the center link and into the shaft;
    a first inner wheel disposed on said shaft adjacent said first side of said center link;
    a second inner wheel disposed on said shaft adjacent said second side of said center link;
    a first intermediate wheel disposed on said shaft adjacent said first inner wheel;
    a second intermediate wheel disposed on said shaft adjacent said second inner wheel;
    a first outer wheel disposed on said shaft adjacent said first intermediate wheel; and
    a second outer wheel disposed on said shaft adjacent said second intermediate wheel.

10. The auto-laundry conveyor dolly of claim 9, wherein the shaft includes:
    a cylindrical central portion having a longitudinal portion, a diameter, and first and second ends, a first cylindrical lobe having a diameter smaller than the cylindrical central portion diameter and extending from the first end of the cylindrical central portion such that an outer surface of the first cylindrical lobe is flush with an outer surface of the cylindrical central portion and none of the surfaces of the first cylindrical lobe extend beyond the surfaces of the cylindrical central portion, a second cylindrical lobe having a diameter smaller than the cylindrical central portion diameter and extending from the second end of the cylindrical central portion such that an outer surface of the second cylindrical lobe is flush with the outer surface of the cylindrical central portion that is flush with the outer surface of the first cylindrical lobe and none of the surfaces of the second cylindrical lobe extend beyond the surfaces of the cylindrical central portion, and wherein a pin hole is formed in the cylindrical central portion substantially centered along the longitudinal portion of the cylindrical central portion, the cylindrical central portion being flush with the first and second cylindrical lobes; and the center link includes a link hole;

wherein the pin is disposed through the link hole and into the pin hole.

11. An auto-laundry conveyor dolly of the type intended to roll on a slotted track, said dolly comprising:

a metal shaft;

a plurality of grooves formed into the metal shaft, wherein at least one wheel of said dolly is mounted on the shaft between a pair of physically-adjacent grooves from said plurality of grooves;

a snap ring inserted into each of the plurality of grooves formed in the metal shaft;

a plurality of wheels situated on the metal shaft between adjacent snap rings; and wherein each of the plurality of wheels has a hole through its center defining an inner diameter of the wheel, an outer surface defining an outer diameter of the wheel, a first side, a second side, and an indentation on each of the first and second sides extending from the hole toward the outer surface, but not extending as far as the outer surface.

12. The auto-laundry conveyor dolly of claim 11, wherein each of the snap rings are sized to fit within the indentations in the sides of the wheels.

13. The auto-laundry conveyor dolly of claim 11, further comprising a thrust washer disposed between at least one of the snap rings and at least one of the wheels and fitting into the indentation in the side of at least one of the wheels.

14. An auto-laundry dolly connected to a conveyor chain of a slotted track of an auto laundry facility, the dolly comprising:

a shaft made of a single, hollow, cylindrical metal tube that includes: a cylindrical central portion, a pair of cylindrical side portions on opposite sides of said central portion, wherein said pair of side portions is formed by cutting a pair of central grooves into said metal tube at corresponding ends of said central portion, and wherein both of said side portions and said central portion are coaxial and substantially of the same external diameter, a pair of side grooves cut into said metal tube at opposite outer ends of said pair of side portions and being coaxial with said pair of side portions, a pair of cylindrical side lobes formed on both ends of said metal tube, wherein each side lobe in said pair of side lobes is linked to a respective side portion in said pair of side portions via a corresponding side groove from said pair of side grooves, and wherein centers of said pair of side lobes are axially offset from the centers of the pair of side portions and the central portion, a pair of end grooves cut into said metal tube at opposite outer ends of said pair of side lobes and being coaxial with said pair of side lobes, and a cross-sectionally substantially circular pin hole drilled into the middle of a top surface of said central portion, wherein said top surface is longitudinally substantially aligned with respective top surfaces of said pair of side lobes and said pair of side portions;

a center link attached to said central portion and comprising a link hole of substantially the same diameter as said pin hole;

a cylindrical pin inserted through said link hole and said pin hole to thereby non-movably attaching said center link to said central portion for connecting the dolly into said conveyor chain of said slotted track;

a pair of inner wheels mounted on the central portion on opposite sides of the center link and sandwiched between the pair of central grooves;

a first pair of thrust washers mounted on the central portion on opposite sides of the center link between said inner wheels and said center link;

a first pair of open-ended snap rings non-movably inserted into said pair of central grooves;

a second pair of open-ended snap rings non-movably inserted into said pair of side grooves;

a pair of intermediate wheels mounted on the pair of side portions between said first pair of snap rings and said second pair of snap rings, wherein said intermediate wheels being coaxial with and substantially of the same internal diameter as said inner wheels;

a second pair of thrust washers mounted on said pair of side portions between said first pair of snap rings and sides of said intermediate wheels adjacent to said first pair of snap rings;

a third pair of open-ended snap rings non-movably inserted into said pair of end grooves; and a pair of outer wheels mounted on the pair of side lobes between said second pair of snap rings and said third pair of snap rings, wherein said outer wheels are axially offset from said intermediate wheels.

15. An auto-laundry conveyor dolly of the type intended to roll on a slotted track, said dolly comprising:

a singular shaft, having:

a central portion having a first axis, a first diameter, a center link attachment portion, a first side coaxial to said first axis, and a second side coaxial to said first axis;

a first side portion having a second axis, a second diameter, a first side coaxial to said second axis, and a second side coaxial to said second axis, said first side of said first side portion adjacent to said first side of said central portion;

a second side portion having a third axis, a third diameter, a first side coaxial to said third axis, and a second side coaxial to said third axis, said first side of said second side portion adjacent to said second side of said central portion;

a first side lobe having a fourth axis, a fourth diameter, a first side coaxial to said fourth axis, and a first outer end coaxial to said fourth axis, said first side of first side lobe adjacent to said second side of said first side portion; and a second side lobe having a fifth axis, a fifth diameter, a first side coaxial to said fifth axis, and a second outer end coaxial to said fifth axis, said first side of second side lobe adjacent to said second side of said second side portion;

a first inner wheel disposed on said center portion adjacent to said first side of said central portion and having a first outer diameter;

a second inner wheel disposed on said center portion adjacent to said second side of said central portion and having a second outer diameter;

a first intermediate wheel disposed on said first side portion, having an third outer diameter;

a second intermediate wheel disposed on said second side portion, having an fourth outer diameter;

a first outer wheel disposed on said first side lobe, the first outer wheel having a fifth outer diameter that is smaller than the first outer diameter, the second outer diameter, the third outer diameter and the fourth outer diameter; and a second outer wheel disposed on said second side lobe, the having a sixth outer diameter that is smaller than the first outer diameter, the second outer diameter, the third outer diameter and the fourth outer diameter.

16. The auto-laundry conveyor dolly of claim 15, wherein:
said fourth diameter is smaller than the diameter of said first diameter, second diameter and third diameter;
said fifth diameter is smaller than the diameter of said first diameter, second diameter and third diameter;
said fourth axis is axially offset from said first axis, second axis, and third axis; and
said fifth axis is axially offset from said first axis, second axis and third axis.

17. The auto-laundry conveyor dolly of claim 15, further comprising a plurality of grooves disposed along said shaft.

18. The auto-laundry conveyor dolly of claim 17, wherein:
said grooves are disposed adjacent to said first side of said central portion, said second side of said central portion, said first side of said first side portion, said second side of said first side portion, said first side of said second side portion, said second side of said second side portion, said first side of said first side lobe, said first outer end of first side lobe, said first side of second side lobe, and said second outer end of second side lobe.

19. The auto-laundry conveyor dolly of claim 17, wherein each of said grooves is adapted to accept a snap ring.

20. The auto-laundry conveyor dolly of claim 15, wherein said center portion has a top surface; and
said center link attachment portion further comprises a hole disposed longitudinally aligned along said top surface of said center portion, said hole being adapted to accept a pin.

21. The auto-laundry conveyor dolly of claim 20, further comprising:
a center link having a chain attachment portion, and a circular portion that is configured to encircle said center portion;
said circular portion having a hole passing through that is adapted to accept a pin; and
a pin passing though said circular portion of said center link into said hole of said center link attachment portion of said center portion of said shaft.

* * * * *